(12) United States Patent
Gell et al.

(10) Patent No.: US 7,563,503 B2
(45) Date of Patent: Jul. 21, 2009

(54) COATINGS, MATERIALS, ARTICLES, AND METHODS OF MAKING THEREOF

(75) Inventors: Maurice Gell, Newington, CT (US); Xinqing Ma, Storrs, CT (US); Eric Jordan, Storrs, CT (US); Nitin P. Padture, Storrs, CT (US); Liangde Xie, Storrs, CT (US); Danny Xiao, Willington, CT (US); Anthony DeCarmine, Lebanon, CT (US)

(73) Assignees: The University of Connecticut, Storrs, CT (US); US Nanocorp, Inc., Farmington, CT (US); Inframat Corporation, Farmington, CT (US)

( * ) Notice: Subject to any disclaimer, the term of this patent is extended or adjusted under 35 U.S.C. 154(b) by 192 days.

(21) Appl. No.: 10/755,856

(22) Filed: Jan. 12, 2004

(65) Prior Publication Data
US 2004/0229031 A1   Nov. 18, 2004

Related U.S. Application Data (60) Provisional application No. 60/439,288, filed on Jan. 10, 2003.

(51) Int. Cl.
  *B32B 5/18* (2006.01)
  *B32B 5/02* (2006.01)
  *B32B 5/14* (2006.01)
  *B32B 5/22* (2006.01)

(52) U.S. Cl. .............. 428/304.4; 428/312.2; 428/317.9; 428/332; 428/338

(58) Field of Classification Search ................. 428/701, 428/325, 702, 134, 304.4, 312.2, 908.8, 698; 106/404, 450
See application file for complete search history.

(56) References Cited

U.S. PATENT DOCUMENTS

| | | | |
|---|---|---|---|
| 2,746,883 A | 5/1956 | Powers | |
| 4,377,371 A | 3/1983 | Wisander et al. | ............ 415/174 |
| 4,603,568 A | 8/1986 | Siemers et al. | |
| 5,032,568 A | 7/1991 | Lau et al. | ........................ 505/1 |
| 5,073,433 A | 12/1991 | Taylor | ........................ 428/134 |
| 5,250,780 A | 10/1993 | Hansz et al. | |
| 5,304,519 A | 4/1994 | Jackson et al. | ............. 501/103 |
| 5,418,015 A | 5/1995 | Jackson et al. | ............. 427/452 |
| 5,421,895 A | 6/1995 | Tsubouchi et al. | .......... 118/726 |

(Continued)

FOREIGN PATENT DOCUMENTS

GB          2100621          6/1981

(Continued)

OTHER PUBLICATIONS

Guilemany et al. (High Temperature Surface Engineering, Proceedings of the International Conference in the Series Engineering the Surface, 6th, Edinburgh, United Kingdom, 2000, p. 275-281.*

(Continued)

*Primary Examiner*—Jennifer McNeil
*Assistant Examiner*—Jason L Savage
(74) *Attorney, Agent, or Firm*—Cantor Colburn LLP (57) ABSTRACT

A thermal spray process comprises injecting precursor solution droplets into the hot zone of the thermal spray flame. Also described are materials resulting from the process.

28 Claims, 8 Drawing Sheets

U.S. PATENT DOCUMENTS

| | | | |
|---|---|---|---|
| 5,445,324 | A | 8/1995 | Berry et al. |
| 5,520,516 | A * | 5/1996 | Taylor et al. ............ 416/241 B |
| 5,609,921 | A | 3/1997 | Gitzhofer et al. ............ 427/446 |
| 5,620,524 | A | 4/1997 | Fan et al. .................... 118/726 |
| 5,743,013 | A | 4/1998 | Taylor et al. ............... 29/889.7 |
| 5,744,777 | A | 4/1998 | Bernecki et al. ....... 219/121.47 |
| 5,858,470 | A | 1/1999 | Bernecki et al. ............ 427/453 |
| 5,876,683 | A | 3/1999 | Glumac et al. .............. 423/325 |
| 6,025,034 | A | 2/2000 | Strutt et al. ................. 427/450 |
| 6,132,653 | A | 10/2000 | Hunt et al. ...................... 264/5 |
| 6,195,504 | B1 | 2/2001 | Horie et al. ................. 392/394 |
| 6,277,448 | B2 | 8/2001 | Strutt et al. ................. 427/452 |
| 6,432,487 | B1 | 8/2002 | Graham et al. .............. 427/454 |
| 6,447,848 | B1 | 9/2002 | Chow et al. ................. 427/446 |
| 2002/0031658 | A1 * | 3/2002 | Chow et al. .................. 428/323 |
| 2002/0062789 | A1 | 5/2002 | Nguyen et al. |
| 2003/0031806 | A1 | 2/2003 | Jinks |
| 2003/0108680 | A1 * | 6/2003 | Gell et al. ................... 427/446 |
| 2003/0228441 | A1 * | 12/2003 | Subramanian .............. 428/120 |

FOREIGN PATENT DOCUMENTS

| | | |
|---|---|---|
| WO | WO 97/05994 | 2/1997 |
| WO | WO 98/41316 | 9/1998 |
| WO | WO 00/00660 | 1/2000 |

OTHER PUBLICATIONS

Lin et al. (Journal of Thermal Spray Technology, vol. 3(1) Mar. 1994 p. 75-104).*

Arellano-Lopez, "Microstructural Characterization of Small-Particle Plasma Spray Coatings". J. Am. Ceram. Soc, 82 (8) 2204-2208 (1999).

Bouyer, et al. "Characterization of SiC and Si3N4 coatings synthesized by means of inductive thermal plasma from disilane precursors". Applied Organometallic Chemistry. Appl. Organometal. Chem. 2001; 15: 833-840.

Delbos, et al. "Plasma Spray Elaboration of Finely Structured YSZ Thin Coating by Liquid Suspension Injection", Thermal Spray 2003: Advancing the Science & Applying the Technology, (Ed.) C. Moreau and B. Marple, Published by ASM International, Materials Park, Ohio, USA, 2003. pp. 661-669.

Devi, et al. "Comparison of citrate-nitrate gel combustion and precursor plasma spray processes for the synthesis of yttrium aluminum garnet". J. Mater. Res., vol. 17, No. 11, Nov. 2002. pp. 2846-2851.

Davi, et al. "Single-step deposition of Eu-doped Y2O3 phosphor coatings through a precursor plasma spraying technique". J. Mater. Res., vol. 17, No. 11, Nov. 2002. pp. 2771-2774.

Karthikeyan, et al. "Preparation of Nanophase Materials by Thermal Spray Processing of Liquid Precursors". NanoStructured Materials, vol. 9, pp. 137-140. 1997.

Karthikeyan, et al. "nanomaterial Deposits Formed by DC Plasma Spraying of Liquid Feedstocks". J. Am. Ceram. Soc., 81 (1) 121-128 (1998).

Karthikeyan, et al. "Nanomaterial Powders and Deposits Prepared by Flame Spray Processing of Liquid Precursors". NanoStructured Materials, vol. 8. No. 1, pp. 61-74, 1997.

Ma, et al. "Intermediate Temperature SOFC Based on Fully Integrated Plasma Sprayed Components". 6 pages.

Ma, et al. "Study of Unique Microstructure in SPS Ceramic NanoCoatings". 6 pages.

Padture, et al. "Towards Durable Thermal Barrier Coatings with Novel Microstructures Deposited by Solution-Precursor Plasma Spray". Acta mater. 49 (2001) 2251-2257.

Su, et al. "In Situ Characterization of Small-Particle Plasma Sprayed Powders". Journal of Thermal Spray Technology vol. 11 (1) Mar. 2002 pp. 52-61.

Parukuttyamma, et al. "Yttrium Aluminum Garnet (YAG) Films through a Precursor Plasma Spraying Technique". J. Am. Ceram. Soc., 84 (8) 1906-1908 (2001).

Tikkanen, et al. "Characteristics of the liquid flame spray process". Surface and Coatings Technology 90 (1997) 210-216.

Schlichting, "Failure Modes in Plasma-Sprayed Thermal Barrier Coatings" University of Connecticut, (2000) 186 pages.

Scott Henry, et al. "ASM International" Library of Congress Cataloging-in-Publication Data. Sep. 2004.

* cited by examiner

COATINGS, MATERIALS, ARTICLES, AND METHODS OF MAKING THEREOF

CROSS REFERENCE TO RELATED APPLICATIONS

This application claims priority to Provisional Application Serial No. 60/439,288 filed on Jan. 10, 2003, which incorporated by reference herein.

STATEMENT REGARDING FEDERALLY SPONSORED RESEARCH & DEVELOPMENT

The U.S. Government has certain rights in this invention pursuant to Office of Naval Research grant numbers N00014-98-C-0010, N00014-02-1-0171.

BACKGROUND

There is a wide variety of methods for forming a coating or deposited material. Methods include chemical vapor deposition, physical vapor deposition, laser assisted pyrolysis deposition, electron-beam physical vapor deposition and thermal spray. The coating or material produced by these methods can vary significantly in microstructure from method to method. The microstructure of the coating or material, as well as its composition, has a significant impact the physical and mechanical properties, as well as the end use. Thus it is clear that there is a complex interaction between the microstructure, composition, end use and the method of making the coating or material.

Microstructure, as used herein, refers to the structure of the material or coating on a microscopic level. Components of microstructure include the phases present, grain size, precipitate and/or dispersoid size, density/porosity, cracking, and the presence and size of lamellar splats (in thermal spray methods). Splats are the result of molten or partially molten particles impinging upon a substrate at a high temperature, high speed or combination of high temperature and high speed. The size of the splat boundary is related to the size of the splat and large splat boundaries may result in lateral cracking, potentially causing material failure. These components of microstructure may affect gross physical properties of the coating such as thermal conductivity, bond strength, elastic modulus and so forth. As can be readily appreciated some of these gross physical characteristics are desirable in some uses and not in others. None of the currently available methods of deposition is capable of manipulating all the above-described microstructural features.

Of the above-described methods, thermal spray is the most flexible with regard to feedstocks. Thermal spray may employ a solid, powdered feedstock, a dispersion of a solid, powdered feedstock in a liquid carrier, or a liquid precursor. Thermal spray is highly flexible with regard to the composition of the feedstock owing to the variety of available flame types, velocities and flame temperatures and resulting in a wide compositional variety in the produced materials. Additionally, thermal spray generally is highly efficient making it a cost effective method.

What is needed in the art is a cost effective method of material deposition that can produce materials and coatings with a variety of compositions and microstructural features.

BRIEF SUMMARY

The above-described and other drawbacks are alleviated by a method of producing a material comprising:

injecting precursor solution droplets into a thermal spray flame wherein a first portion of the precursor solution droplets are injected into a hot zone of the flame and a second portion of the precursor solution droplets are injected into a cool zone of the flame;

fragmenting the droplets of the first portion to form reduced size droplets and pyrolyzing the reduced size droplets to form pyrolyzed particles in the hot zone;

at least partially melting the pyrolyzed particles in the hot zone;

depositing the at least partially melted pyrolyzed particles on a substrate;

fragmenting at least part of the second portion of precursor solution droplets to form smaller droplets and forming non-liquid material from the smaller droplets; and depositing the non liquid material on the substrate. The substrate may be optionally preheated and/or maintained at a desired temperature during deposition.

The material produced by this method comprises splats having an average diameter of less than or equal to about 2 micrometers. Additionally the splats preferably have a thickness less than or equal to about 800 nanometers. The material may also exhibit three dimensional porosity of about 1 to about 50 volume percent, and the pores may be micrometer sized (about 1.0 to about 50 micrometers), submicron sized (about 0.1 to about 1.0 micrometer), nanometer sized (up to about 100 nanometers) or a combination of two or more of the foregoing. The material can optionally have vertical cracks that vary in length from about 0.5 to 1.0 times the thickness of the material. The vertical cracks generally are spaced at a distance less than the coating thickness but can be spaced at distances up to two times the thickness of the material. The material may optionally comprise inter pass boundaries. The material may be employed as a coating over a large thickness range of about 1 micrometer to over 5 millimeters or as a structural preform.

BRIEF DESCRIPTION OF THE DRAWINGS

Referring now to the drawings wherein like elements are numbered alike in several FIGURES.

DETAILED DESCRIPTION OF THE PREFERRED EMBODIMENTS

The above-described and other drawbacks are alleviated by a method of producing a material comprising:

injecting precursor solution droplets into a thermal spray flame wherein a first portion of the precursor solution droplets are injected into a hot zone of the flame and a second portion of the precursor solution droplets are injected into a cool zone of the flame;

fragmenting the droplets of the first portion to form reduced size droplets and pyrolizing the reduced size droplets to form pyrolized particles in the hot zone;

at least partially melting the pyrolized particles in the hot zone;

depositing the at least partially melted pyrolized particles on a substrate;

fragmenting at least part of the second portion of precursor solution droplets to form smaller droplets and forming non-liquid material from the smaller droplets; and depositing the non-liquid material on the substrate. The substrate may be optionally preheated and/or maintained at a desired temperature during deposition. As readily understood by one of ordinary skill in the art, the terms first portion and second portion do not imply a sequential order but are merely used to differentiate the two portions.

Without being bound by theory it is believed that non-liquid material formed in the cool zone contributes to the creation of porosity, vertical cracks, and inter pass boundaries. Non-liquid material includes both solid and gel-like materials and is, at most, only partially pyrolized and may be completely unpyrolized. The volume contraction that occurs in the material when the trapped residual liquid is heated and the non-liquid material undergoes crystallization contributes, along with the thermal expansion mismatch between the coating and the underlying substrate, to the formation of vertical cracks. Additionally, volume contraction contributes to the formation of porosity.

The material produced by this method comprises splats having an average diameter of less than or equal to about 2 micrometers. Additionally the splats preferably have a thickness less than or equal to about 800 nanometers. All splats in the material are less than about 5 micrometers in diameter. The material may also exhibit porosity of about 1 to about 50 volume percent, and the pores may be micrometer sized (about 1.0 to about 50 micrometers), submicrometer sized (about 0.1 to about 1.0 micrometers), nanometer sized (up to about 100 nanometers) or a combination of two or more of the foregoing. The material can optionally have vertical cracks that vary in length from about 0.5 to 1.0 times the thickness of the material. The vertical cracks generally are spaced at a distance less than the coating thickness but can be spaced at distances up to two times the thickness of the material. The vertical cracks can be generated in materials having a porosity of about 13 to about 50 volume percent. The material may be employed as a coating over a large thickness range (about 2 micrometers to over 5 millimeters) or as a structural preform.

It has been unexpectedly discovered that injecting the precursor solution droplets predominantly into the hot zone of the flame results in a material having an average splat size less than or equal to about 2 micrometers. A thermal spray flame typically has at least two zones based on the flame temperature range: the hot zone which has a temperature greater than or equal to the pyrolization temperature of the precursor salt, and the cool zone which has a temperature less than the pyrolization temperature of the precursor salt. When the precursor solution comprises more than one precursor salt the lowest pyrolization temperature determines the size/location of the flame zones. Controlling the location of injection and droplet momentum are required to ensure the desired amount of the droplets penetrate the hot zone for fragmentation and subsequent pyrolysis. Pyrolysis is defined herein as the conversion of the precursor to the desired material without substantial degradation. Precursor solution injection may be radial or coaxial into the hot zone.

The droplets need sufficient mass and velocity to carry the droplets into the desired zone. Without being bound by theory it is believed that upon entering the hot zone of the flame the some of the droplets may have formed or may rapidly form a crust. As the solvent portion of the droplet inside the crust vaporizes the droplet explodes resulting in the formation of a large number of very small droplets and/or particles. Alternatively the droplet may be fragmented by a dynamic interaction between the velocity of the droplet and the velocity of the flame. As can be readily appreciated based on these theories, parameters such as precursor solution viscosity, precursor solution surface tension, precursor solution concentration, droplet momentum, injection location, flame temperature and droplet residence time in the flame and particularly in the desired zone of the flame have bearing on the splat size and overall microstructure.

Additionally it has been discovered that heating the substrate prior to thermal spraying and/or maintaining the substrate temperature within a desired range can impact the bond strength and microstructure of the materials produced, particularly in the formation of coatings such as thermal barrier coatings.

Useful substrates include, but are not limited to, metals, coated metals such as bond coated metals, ceramics, cermets, and plastics. The substrate must be capable of withstanding the conditions of the thermal spray process. For example, when the thermal spray process includes preheating the substrate, the substrate material should be capable of being heated to the desired preheat temperature and coating temperature without structural degradation. Exemplary materials capable of withstanding preheating include, but are not limited to, stainless steel, titanium, aluminum, superalloys (such as nickel superalloys and cobalt superalloys) and ceramics. In contrast to currently available thermal spray methods, in one embodiment the surface roughness of the substrate may have little or no impact on the material-substrate bond strength. The thermal spray method described herein is capable of forming a material on a polished substrate and the resulting composite material exhibits satisfactory bond strength as demonstrated by substantially no delamination or spalling.

The substrate may have an average roughness (Ra) greater than or equal to about 0.1 micrometers, preferably greater than or equal to about 5.0 micrometers.

The substrate may be preheated, typically by employing a temperature control unit. The temperature control unit may comprise a heat supply, a cooling jet, temperature measurement means and optionally temperature recording means. The temperature measurement means is located on the substrate side opposite the thermal spray flame source for reliability and durability. The heat supply may be, for example, a scanning thermal spray flame, an electrical resistance heater or other heating device known in the art. Preheat temperatures are greater than room temperature, preferably greater than or equal to about 150° C., and more preferably greater than or equal to about 200° C. Additionally the preheat temperature is typically less than or equal to about 600° C., preferably less than or equal to about 500° C., and more preferably less than or equal to about 450° C. Alternatively or in addition the temperature control unit may be used to maintain the substrate and/or deposited material at a desired temperature range during thermal spray. Typically the desired temperature of the substrate and/or deposited material during thermal spray is greater than or equal to about 250° C., preferably greater than or equal to about 275° C., and more preferably greater than or equal to about 300° C. It is envisioned that the maximum desired temperature for the substrate and/or deposited material during solution thermal spray would be less than or equal to about 700° C., preferably less than or equal to about 650° C., and more preferably less than or equal to about 600° C.

The precursor solution may be prepared by dissolving a precursor in a solvent. The precursor may be a liquid or a solid such as a precursor salt. Suitable precursor salts comprise, for example, carboxylate salts, acetate salts, nitrate salts, chloride salts, alkoxide salts, butoxide salts, and the like of, for example, alkali metals, alkaline earth metals, transition metals, rare earth metals and the like, and combinations comprising one or more of the foregoing salts. Preferred precursor salts include, for example, zirconium nitrate, zirconium carbonate, zirconium acetate, yttrium nitrate, aluminum nitrate, gadolinium acetate, gadolinium nitrate, samarium acetate, samarium nitrate, ytterbium acetate, ytterbium nitrate, nickel nitrate, cerium acetate, lanthanum acetate, iron nitrate, zinc nitrate, and combinations comprising one or more of the foregoing salts.

Suitable solvents include those solvents and combinations of solvents capable of dissolving the precursor(s). Exemplary solvents include water, alcohols having 1 to about 5 carbons, carboxylic acids, organic solvents, and combinations of the foregoing solvents.

In the case of complex compounds such as a mixed oxide ceramic, the reagents are weighed according to the desired stoichiometry of the final compound, i.e., mixed oxide, and then added and mixed with the solution. The precursor solution may be heated and stirred to dissolve the solid components and homogenize the solution. Reagent grade precursors may be suitable for the manufacture of the coatings, particularly for doped semiconductors or oxide membranes used as electronic components, electrodes or electrolytes. Industrial grade precursors may be preferred for the manufacture of structural thick coatings or bulk materials due to the low cost of the starting chemicals. For the fabrication of composite or graded coatings, two or more different precursor solutions may be prepared, and stored in individual containers. The precursor solutions may then be combined prior to spraying or atomized in separate nozzles and sprayed simultaneously or sequentially.

The precursor solution is delivered to a liquid injector, preferably an atomizing injector nozzle or a piezo electric crystal induced liquid injector. In a one embodiment the precursor solution is atomized into micrometer sized droplets in the atomizing injector nozzle and injected into the thermal spray flame, primarily into the hot zone of the thermal spray flame. In another embodiment, precursor solution is introduced to the thermal spray flame by a piezo electric crystal induced liquid injector which produces large (greater than about 50 micrometers) droplets of low velocity. The majority of the large droplets have sufficient momentum to be carried into the hot zone of the thermal spray flame. The precursor solution may be injected into the thermal spray flame internally or externally, radially or coaxially. When the precursor solution is injected radially, the injector nozzle may be oriented at an angle of about 45° to about 90° relative to the axis of the flame. Preferably the injector nozzle is oriented at about 90° relative to the flame axis. The injection parameters may impact the porosity of the deposited material and the presence or absence of vertical cracks. Multiple radial injectors may be used forming composite or graded materials or increasing deposition efficiency.

Micrometer sized droplets exiting an atomizing injector nozzle are herein defined as having a diameter less than or equal to about 50 micrometers, preferably less than or equal to about 30 micrometers and more preferably less than or equal to about 20 micrometers. Additionally, micrometer sized droplets have a diameter greater than or equal to about 0.5 micrometers, preferably greater than or equal to about 1 micrometers, and most preferably greater than or equal to about 5 micrometer. Preferably the atomizing gas used in the injector nozzle has a pressure of about 30 pounds per square inch (psi), preferably about 25 psi and more preferably about 20 psi of the pressure of the precursor solution.

Useful thermal spray methods include all known types of thermal spray. Preferably plasma spray is employed. When plasma spray is the thermal spray method, the porosity and the generation of vertical cracks can be impacted by the argon flowrate. In the case of porosity, a low degree of porosity may be produced using a low argon flow rate. The lower argon flow rate results in a higher temperature plasma flame. In the case of vertical cracking, a high argon flow rate may increase the spacing between the vertical cracks. The high argon flow rate results in a lower temperature flame. Parameters of other types of thermal spray may be similarly modified to achieve similar effects.

The material formed by the solution plasma spray process has fine splats. A splat is defined as a thin platelet formed when the particles formed in the plasma flame from the reduced size droplets of precursor solution are at least partially melted and impinge on the substrate. Splats may typically be described as having a length, width and thickness. For convenience, the diameter is herein defined as the length or the width, whichever is greater. Fine splats are defined as having an average diameter less than about 2 micrometers, preferably less than or equal to about 1.5 micrometers, and more preferably less than or equal to about 1 micrometer in size. Additionally the splats have a thickness less than or equal to about 800 nanometers, preferably less than or equal to about 700 nanometers, and more preferably less than or equal to about 600 nanometers.

The material may exhibit porosity of about 1 to about 50 volume percent, based on the total volume of the material. The porosity is three-dimensional when the porosity is greater than or equal to about 8 volume percent. Three-dimensional porosity is herein defined as interpenetrating porosity substantially evenly and randomly distributed throughout the material. The pores may be micrometer sized (to about 10 micrometers), submicrometer sized (about 0.1 to about 1 micrometer), nanometer sized (up to about 100 nanometers) or preferably a combination of two or more of the foregoing.

Figure 1:
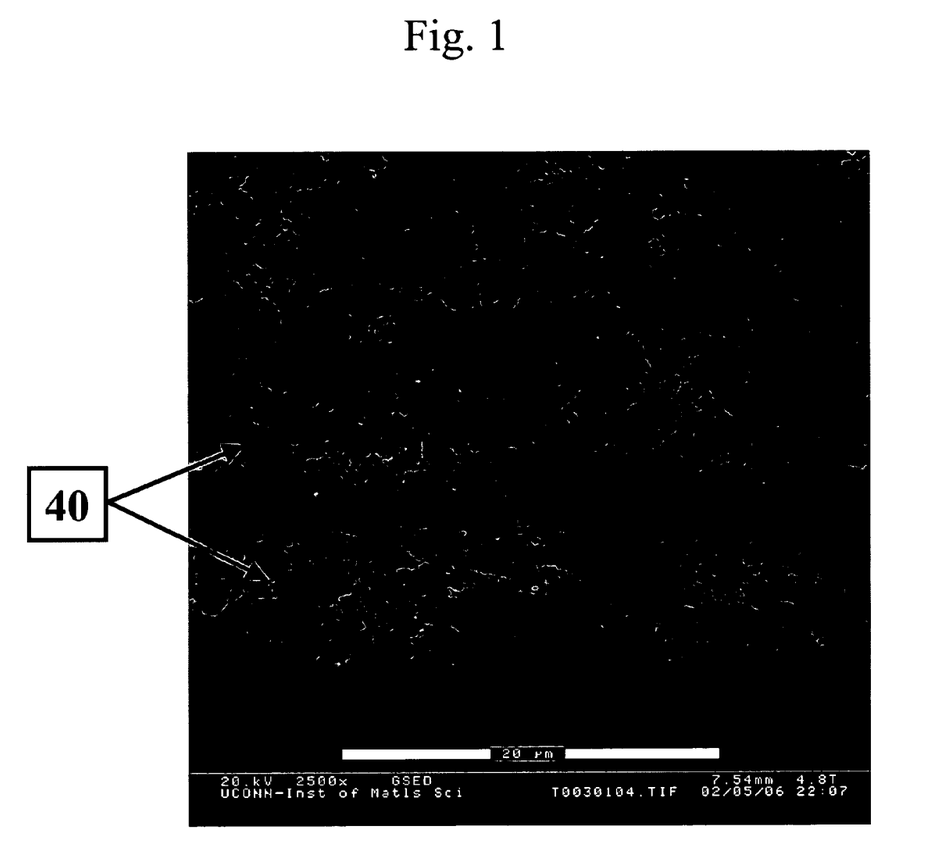
FIG. 1 is a photograph showing inter pass boundaries in a solution plasma spray-formed material.

In some embodiment the deposited material comprises fine layers of porosity and unmelted particles called inter pass boundaries. Inter pass boundaries reduce thermal conductivity. The inter pass boundaries have a thickness of about 0.1 to about 2 micrometers and in some embodiments a thickness of about 0.5 to about 2 micrometers. The porosity of the inter pass boundary may effect the overall thermal conductivity of the deposited material. The porosity of the inter pass boundary is about 20 to about 95 volume percent, preferably about 20 to about 75 volume percent, more preferably about 20 to about 50 volume percent, based on the total volume of the inter pass boundary. The inter pass boundaries may exhibit a layered spacing of about 1 to about 10 micrometers. The inter pass boundaries may be continuous or discontinuous. In some embodiments there are no inter pass boundaries within about 50 micrometers of the substrate/coating interface. The absence of inter pass boundaries within 50 micrometers of the substrate/coating interface can enhance coating longevity when subjected to thermal cycling. FIG. 1 shows inter pass boundaries 40.

The material may optionally comprise vertical cracks. The vertical cracks may vary in length from about 0.5 to about 1.0 times the thickness of the material. When the material comprises layers of separate materials the vertical cracks may extend through the layers. The vertical cracks generally are spaced at a distance less than the material thickness although in some applications, such as thermal barrier coatings, spacing up to about two times the thickness of the material may be useful. Vertical is herein defined as forming an angle of about 60° to about 120° with the material surface. Preferably the crack forms about a 90° angle with the material surface. The solution spray process may be manipulated to vary the amount and spacing of the cracks in the material through variations in the liquid injection position, primary plasma gas flow, and substrate temperature before and during spraying. In general the distance between the liquid injection nozzle and where the flame exits the flame nozzle can be determined without undue experimentation for the desired amount of cracking and crack spacing. When the primary plasma gas flow is high the material exhibits larger crack spacing. High substrate temperatures tend to produce materials with higher levels of cracking. Without being bound by theory it is believed that maintaining a thermal inertia differential between the substrate and deposited coating is important to the formation of vertical cracks.

After deposition the material may be subjected to a post-treatment such as heat treatment, cleaning, surface finishing, near surface finishing and combinations of two or more of the foregoing. Appropriate post-treatment process or processes are readily determined by one of ordinary skill in the art depending upon the composition and intended use.

The solution plasma spray process can be used to make materials having a unique structural morphology featuring fine splats, micrometer sized cracks perpendicular to the substrate surface (i.e., vertical cracks), inter pass boundaries and three-dimensional porosity.

The materials produced by the solution plasma spray method can include, for example, wear resistant coatings, corrosion resistance coatings, thermal barrier coatings, dielectric coatings, catalytic films, electrolyte layers, electrode layers, thick metal oxide coatings, solid conductive layers, semi-conductor films, sensors and activators and the like. In addition to coatings, the solution plasma spray method may be used to form preforms, layered materials, graded materials and composite materials containing nanoparticles and/or nanofibers for thermal insulation, wear and corrosion resistance, and solid state conductivity in the power generation, aerospace and fuel cell areas. Other potential applications include biomedical prostheses, advanced catalysis, battery electrodes, separation membranes, chemical sensors and physical sensors.

The produced material may comprise metal oxides, metal carbides, metal nitrides, metal silicides and combinations of one or more of the foregoing, wherein the metal is, for example, aluminum, boron, sodium, potassium, lithium, calcium, barium, and magnesium; transition metal such as chromium, iron, nickel, zinc, niobium, titanium, zirconium, scandium, yttrium, lanthanum, cerium, gadolinium, praseodymium, neodymium, samarium, terbium, ytterbium; and combinations comprising one or more of the foregoing metals. Stabilized or partially stabilized ceramics such as those stabilized by the presence of one or more rare earth-based compounds may be used. Stabilized ceramics include, for example, zirconia stabilized with yttria (YSZ) or zirconia stabilized by ceria, scandia, calcia, magnesia, gadolinia, lanthia, samaria, neodymium, ytterbia or a combination of two or more of the foregoing.

Preferred materials comprise oxide ceramics such as $Al_2O_3$ (aluminum oxide) and NiO (nickel oxide), rare earth zirconates, in which the rare earth may be ceria, scandia, calcia, magnesia, gadolinia, lanthia, samaria, neodymium, ytterbia or a combination of two or more of the foregoing and mixed oxide ceramics such as $La_2O_3$ doped $CeO_2$ (lanthia-doped ceria), composites such as $NiZnFe_2O_4$ and yttrium aluminum gadolinium (YAG).

Embodiments include, for example, thermal barrier coatings such as $ZrO_2$+6-8 percent by weight (wt %) $Y_2O_3$ based on the total weight of the material (7YSZ), electrolyte layers such as $ZrO_2$+20 wt % $Y_2O_3$ based on the total weight of the material (20YSZ), thick metal oxide coatings such as $Al_2O_3$, anode layers such as NiO and $La_2O_3$-doped $CeO_2$ (LDC), solid conductive layers such as $La_2O_3$-doped $CeO_2$, and solid oxide fuel cell layers.

The thickness and porosity of the material, as well as the presence or absence of cracking, will depend upon the form, type and composition of coating. All porosity volume percents are based on the total volume of the coating. In the case of thermal barrier coatings, it is preferred that the coatings have a thickness of greater than about 125 micrometers and porosity of about 15 to about 40 volume %. For electrolyte layers, the thickness is preferably less than about 200 micrometers and porosity less than about 5 volume %. A thick metal oxide coating can have a thickness of about 500 to about 5000 micrometers and a porosity of about 15 to about 40 volume %. Anode layers can have thicknesses of about 20 to about 200 micrometers with porosity of about 15 to about 50 volume %.

In a bulk material or article fabrication process, the substrates can comprise component templates of various geometries. After solution plasma spray deposition of the material, the template can be removed, or alternatively, can be part of the formed article.

One embodiment is a coating wherein greater than or equal to about 90% of the splats are splats having an average diameter of less than or equal to about 2 micrometers. The coating has a thickness of about 1 micrometer to about 5 millimeters. The porosity is less than or equal to about 10 volume percent and there are no vertical cracks or inter pass boundaries.

One embodiment is a bulk structural material wherein about 80 to about 95% of the splats are splats having an average diameter of less than or equal to about 2 micrometers. The bulk structural material may have a thickness of about 5 millimeters to about 10 centimeters. There are no vertical cracks or inter pass boundaries. The bulk material may undergo additional densification by high temperature and/or thermal pressure processes.

One embodiment is a coating or bulk structural material comprising at least two alternating layers wherein one layer is a material wherein about 80 to about 95% of the splats are splats having an average diameter of less than or equal to about 2 micrometers and there are no vertical cracks or inter pass boundaries. Preferably the porosity is less than or equal to about 10 volume percent, based on the total volume of the layer. Another layer is a material having inter pass boundaries an preferably no vertical cracks.

Figure 2:
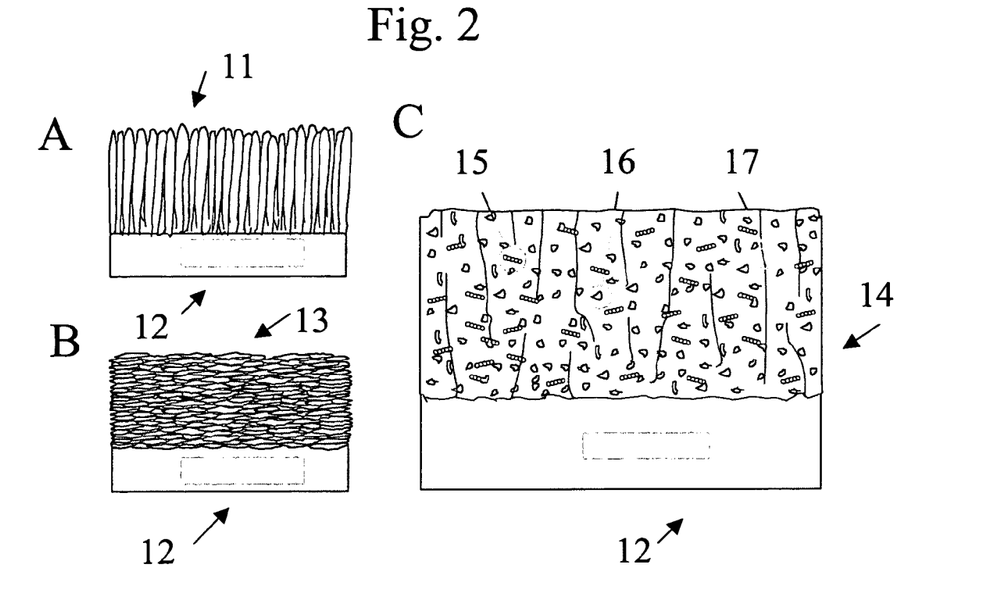
FIG. 2 shows a schematic illustration of a solution plasma spray-deposited coating (C) in comparison to those formed in the electron beam physical vapor deposition process and (A) and conventional thermal spraying (B).

One embodiment is a $Y_2O_3$-stabilized $ZrO_2$ (YSZ) thermal barrier coating (TBC) having the unique microstructural features illustrated in FIG. 2C. FIG. 2 is a schematic illustrating substrates 12 with conventional powdered feedstock plasma sprayed coating 13, (2B), an EB-PVD-deposited coating 11 (2A), and a solution plasma spray-deposited coating 14 (2C). The microstructural features of the solution plasma spray-deposited coating 14 include fine splats, vertical cracks 17, three-dimensional micrometer size porosity 16 and nanometer size porosity 15. The vertical cracking in the solution plasma spray-deposited coating can provide relief from cyclical thermal stress. The existence of micrometer size porosity and nanometer size porosity (i.e., duplex porosity) in the solution plasma spray-deposited coating can result in reduced thermal conductivity and thereby improve thermal insulation properties as well as enhance thermal stress tolerance. The fine splats in the solution plasma spray-deposited coatings can increase coating integrity and decrease unfavorable cracking (especially lateral cracking) compared to a conventionally sprayed coating 13 that has a lamellar structure consisting of many large (i.e., 100 micrometers or greater) inherent splat boundaries as shown in FIG. 2B. The unique coating structure is clearly exhibited in the scanning electron microscope (SEM) cross-section in FIG. 3.

Figure 4:
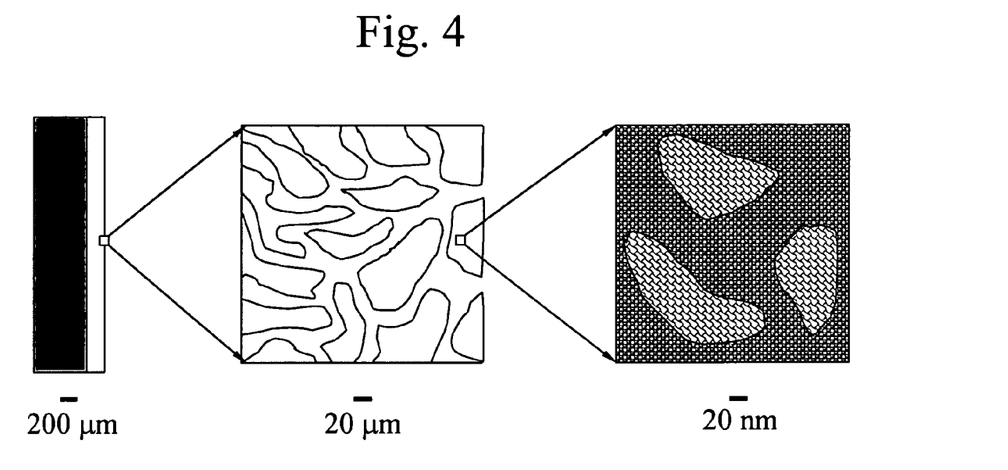
FIG. 4 shows a schematic of the micro and nanostructure of a solution plasma spray-deposited 7YSZ coating.
Figure 5:
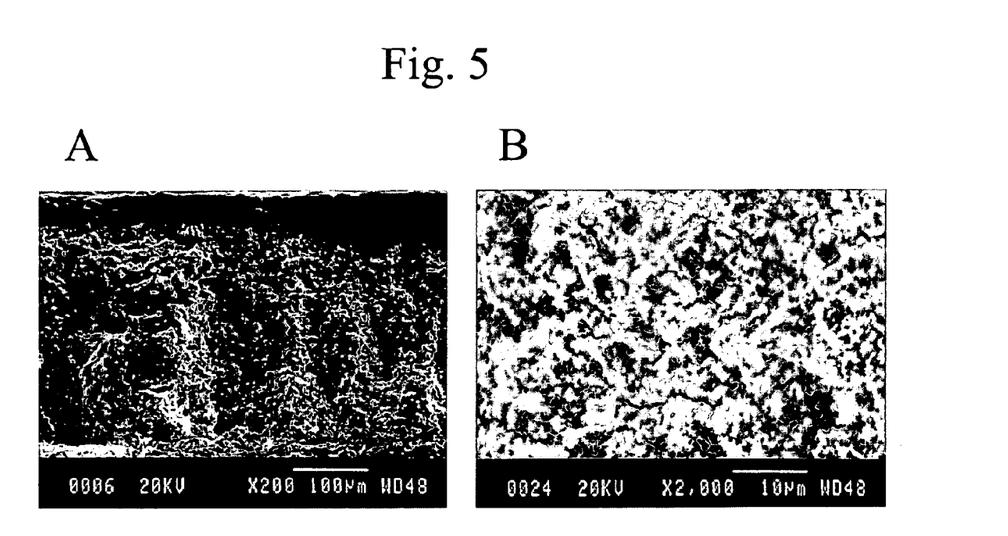
FIG. 5 shows SEM fracture morphologies of solution plasma spray-deposited zirconia stabilized with 20 weight percent yttria (20YSZ) coatings at two different magnifications.

Other characteristics also are identified in the solution plasma spray deposited materials. The solution plasma spray deposited coatings typically consist essentially of nanometer sized features (<100 nanometers) comprising about 10 nanometers to about 60 nanometer size grains. The deposited materials are predominately nanostructured. Additionally the materials typically exhibit greater than about 90% crystallization, preferably greater than about 95% crystallization and more preferably greater than about 98% crystallization. FIG. 4 shows a schematic of the microstructure of the coating illustrating the grain sizes. In the case of YSZ, the phase composition is primarily tetragonal prime-$ZrO_2$ and minor cubic-$ZrO_2$ rich with $Y_2O_3$. The fractured surface of a 20YSZ coating prepared by the solution plasma spray process is shown in FIG. 5.

Figure 6:
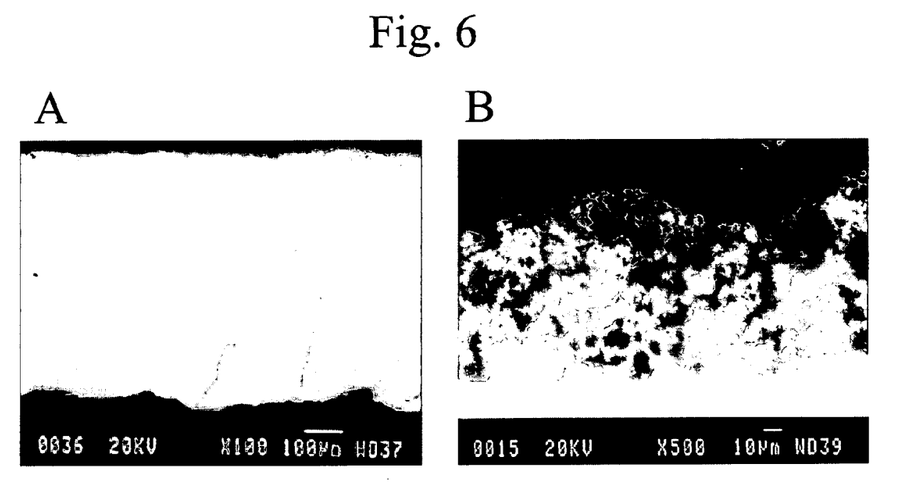
FIG. 6 shows SEM microstructural observations of a low-porosity 20YSZ coating (A) and a high-porosity lanthia-doped ceria (LDC)+nickel oxide (NiO) coating (B) deposited by the solution plasma spray process.

As described above, the characteristics of the materials deposited by solution thermal spray can be systematically varied. The solution plasma spray process is flexible in producing materials with a porosity of about 1 to about 50 volume % of the total volume of the material. In FIG. 6A, a dense 20YSZ coating with a porosity less than 2 volume % of the total volume of the coating is shown. In FIG. 6B, a porous lanthanum doped-ceria ("LDC40") with nickel oxide ("NiO") coating with a porosity more than 40 volume % of the total volume of the coating is shown.

Figure 7:
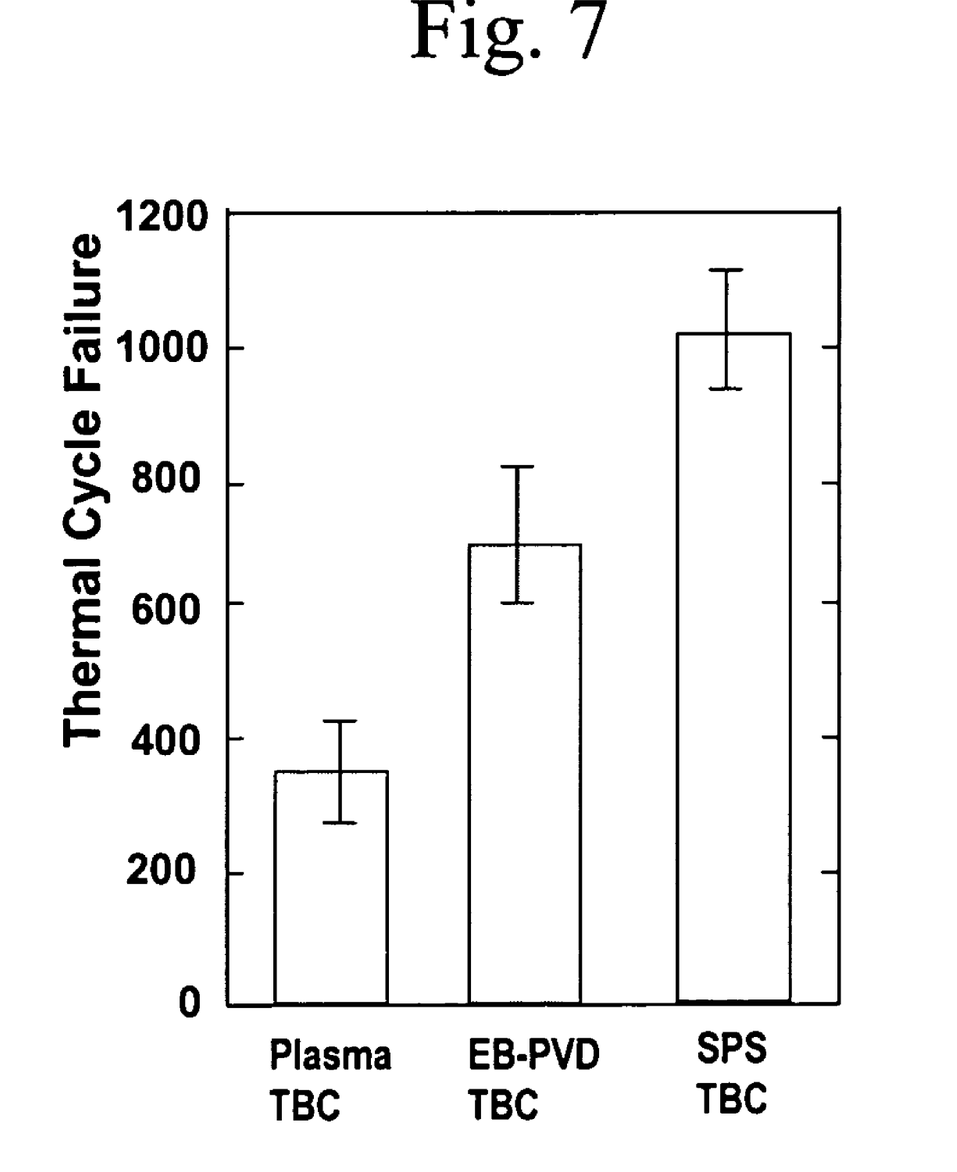
FIG. 7 shows the durability of a solution plasma spray-deposited 7YSZ thermal barrier coating in a thermal cycle test, compared to a conventional powder sprayed TBC and an EB-PVD deposited TBC.

The combination of fine splats, vertical cracks inter pass boundaries and three dimensional porosity is especially valuable in thermal barrier coatings. As shown in FIG. 7, yttria stabilized zirconia thermal barrier coatings deposited by solution plasma spray have improved durability in a thermal cycling test. The yttria-stabilized zirconia coatings can withstand about 1018 or more thermal cycles compared to less than or equal to 675 cycles for an EB-PVD coating and less than or equal to 391 cycles for plasma sprayed coatings employing a powdered feedstock. Each thermal cycle includes heating to 1121° C. within about 2 minutes, holding for 50 minutes followed by forced air cooling to room temperature over a 10 minute period. A sample is considered to have failed when the area of spallation (i.e., where the coating is fully detached from the substrate) and delamination (i.e., where a portion of the coating is detached but still hanging from the substrate) reaches about 50% of the total area of the thermal barrier coating. Thus, a coating that can withstand 1018 cycles has an area of spallation and delamination of less than about 50% of the total area after 1018 cycles.

Figure 8:
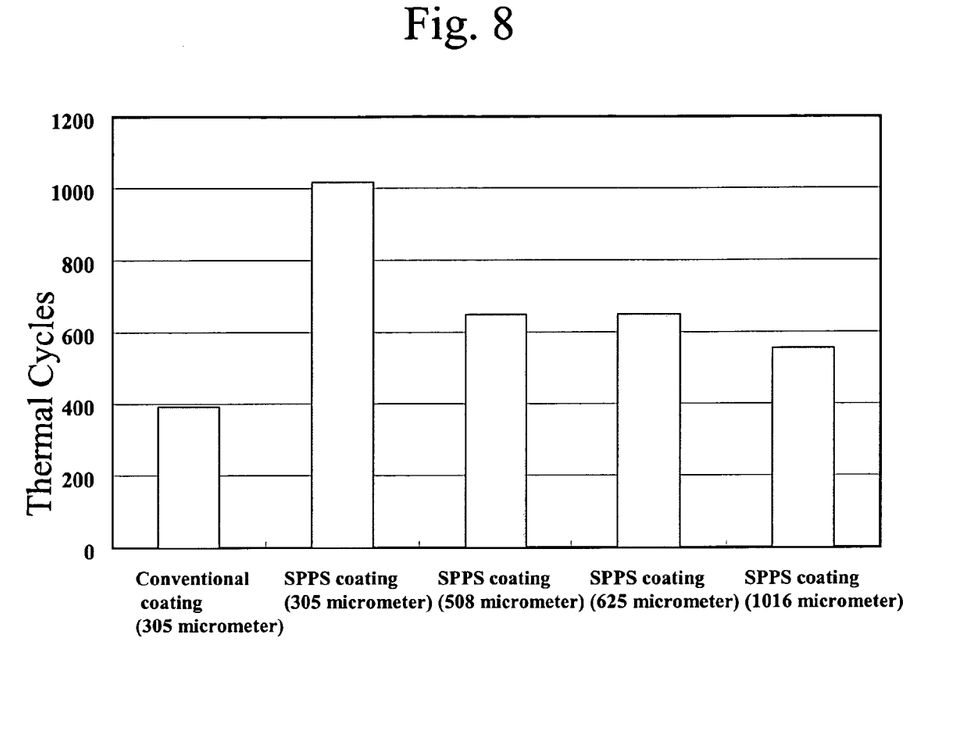
FIG. 8 shows the thermal cycling behavior of solution plasma spray-deposited 7YSZ coatings as a function of the coating thickness, compared to a conventional air plasma sprayed coating.

The thermal barrier coatings produced by solution plasma spray exhibit improved thermal cycling behavior even at coating thicknesses over 12 mils (305 micrometers), FIG. 8. Typically, the thicker the coating, the fewer cycles it can withstand. A 305 micrometer thick powdered feedstock plasma sprayed 7YSZ coating can withstand 391 thermal cycles, while a 305 micrometer solution plasma spray deposited 7YSZ coating can withstand 1018 cycles. Further, 508 micrometer and 635 micrometer solution plasma spray deposited coatings can withstand over 650 thermal cycles. Even a 1016 micrometer solution plasma spray deposited coating can withstand 555 thermal cycles.

The solution plasma spray deposited thermal barrier coatings exhibit improved thermal cycling behavior as compared to powder feedstock plasma sprayed coatings. In a standard 1 hour 1121° C. thermal cycling test, the solution plasma spray deposited coating withstood 1018 cycles, while the powdered feedstock plasma sprayed coating, on an identical substrate, withstood 391 cycles.

Figure 9:
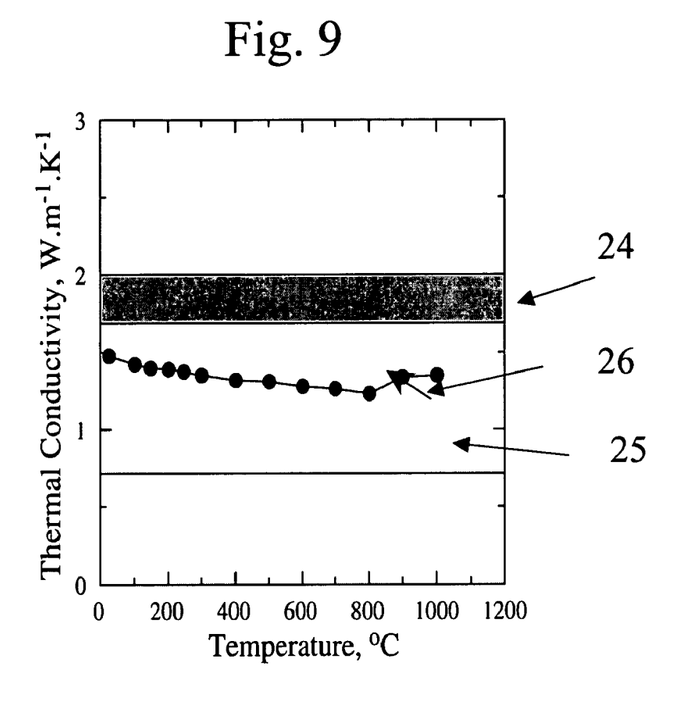
FIG. 9 shows the thermal conductivity of a solution plasma spray-deposited 7YSZ thermal barrier coating compared to the thermal conductivity ranges of both conventional thermal sprayed coatings and an electron beam plasma vapor deposited coatings.

FIG. 9 shows a comparison of thermal conductivity for solution plasma spray deposited coatings, conventional thermal spray coatings, and electron beam physical vapor deposition coatings. The solution plasma spray deposited coatings 26 have about the same thermal conductivity compared to those formed in conventional thermal spraying 25 and lower than that of coatings deposited by electron beam physical vapor deposition 24 process. The thermal conductivity of the deposited material can by varied by the presence or absence of inter pass boundaries, porosity of the material, the frequency and thickness of coating inter pass boundaries, and additions of rare earth elements to the precursor solution.

With the solution plasma spray method, materials can be applied to various substrates made of metal, alloy, ceramic, and the like. The materials produced by the solution plasma spray method can include, for example, thermal barrier coatings; electrical and thermal insulating coatings; thick and thin coatings formed on steel, stainless, Mo, superalloy and ceramic substrates; wear resistant oxide coatings; solid reaction barriers (conductive layers) used for solid oxide fuel cells (SOFCs); electrolyte layers for SOFCs; anode layers for SOFCs; and electrolyte layers for gas separation and purification of hydrogen from syngas in integrated gasification combined cycle units (IGCC). The materials can be used, for example, in applications requiring wear and corrosion resistance such as engines, dielectric and thermal insulation, electrodes and electrolytes for solid oxide fuel cells, and in catalyst applications.

In one embodiment, the coatings can be used as electrolyte layers, conductive layers and/or electrode layers in solid oxide fuel cells (SOFCs). A fuel cell is a device in which a first reactant, a fuel such as hydrogen or a hydrocarbon, is electrochemically reacted with a second reactant, an oxidant such as air or oxygen, to produce a DC electrical output. A fuel cell includes an anode, or fuel electrode, a cathode, or oxidant electrode, and an electrolyte. In an SOFC, a solid electrolyte separates a porous anode from a porous cathode. The SOFC may also contain additional conductive layers or interconnects. Each individual fuel cell, made of a single anode, a single electrolyte, and a single cathode, generates a relatively small voltage, typically about 1 volt. To achieve higher voltages that are practically useful, the individual fuel cells are connected together in series to form a stack.

In the SOFC, the electrolyte layer is preferably dense and preferably has a thickness less than or equal to about 20 micrometers and a porosity less than or equal to about 5%. The anode layer of the SOFC is porous and preferably has a thickness of about 2 to about 500 micrometers for anode supported SOFCs or about 100-200 micrometers for cathode supported SOFCs and a porosity of about 15 to about 40%. The cathode layer of the SOFC is preferably strontium doped $LaMnO_3$ and preferably has a thickness of 50 micrometers for anode supported SOFCs or 2 millimeters for cathode supported SOFCs and a porosity of about 40%. The reaction barrier is dense and preferably has a thickness of about 10-50 micrometers and a porosity of less than or equal to about 5%.

The invention is further illustrated by the following non-limiting examples.

EXAMPLES

Solution plasma spray was used to produce eight different coatings. In each of the coatings, a precursor solution was prepared, poured into a container and fed into the injector by a mechanical pump or a gas-pressure pump operating at about 10 to about 50 psig. The flow rate was regulated at about 5 to about 150 milliliters/minute by a flow meter. A fog nozzle was used to generate atomized droplets with nitrogen as an atomizing gas at 10-50 pounds per square inch (psi). The precursor solution was fed radially into the plasma in an external injection manner. In all cases, the precursor chemicals were reagent grade.

Unless otherwise noted, stainless steel was employed as the substrate. The substrate was coarsened by sand blasting, degreased and cleansed in acetone, and then preheated by plasma torch scanning. A Metco 9M plasma spray system was employed to deposit the coating. The system consisted of a 9MC plasma control console, a 9MCD distribution, a 9MR power supply unit and a 9MB direct current plasma gun. The gun was mounted on a six-axis robotic arm and the substrate was attached to a turntable. The coating rate was about 2 to about 30 micrometers per pass at a deposition efficiency of about 30-75%. The spray parameters for the different coatings are summarized in Table 2. Primary and secondary gas flows are measured in standard cubic feet per hour (SCFH). Except for Example 2, the primary plasma gas was argon at a pressure of 100 psi and the secondary plasma gas was hydrogen at a pressure of 50 psi. In Example 2 the primary plasma gas was argon at a pressure of 100 psi and the secondary plasma gas was helium at 50 psi. The plasma current is described in amperes. The plasma voltage is described in volts. The gun traverse speed and vertical speed are described in millimeters per second (mm/s). The turntable speed is described in rotations per minute (rpm). The distance between the gun nozzle tip and the substrate (spray distance) is described in inches. The substrate preheat temperature is described in degrees Celsius.

TABLE 2

| | Spray parameters for solution thermal spray-deposited coatings | | | | | | | | |
|---|---|---|---|---|---|---|---|---|---|
| Example | 1 | 2 | 3 | 4 | 5 | 6 | 7a | 7b | 8 |
| Primary Gas flow rate (SCFH) | 100-160 | 60-100 | 100-140 | 120-160 | 100-140 | 120-160 | 100-140 | 120-160 | 60-100 |
| Plasma Current (amp) | 650 | 650 | 650 | 600 | 650 | 600 | 650 | 600 | 650 |
| Plasma power (kilowatts) | 35-50 | 35-50 | 35-50 | 35-50 | 35-50 | 35-50 | 35-50 | 35-50 | 35-50 |
| Anode nozzle type | GP | GE | GP | GH | GP | GH | GP | GH | GP |
| Gun traverse speed (mm/s) | 1000 | 500 | 50 | 100 | 100 s | 100 | 100 | 100 | 1000 |
| Gun vertical speed (mm/s) | 4 | 2 | — | — | — | — | — | — | — |
| Spray distance (in) | 1-4 | 1-4 | 1-5 | 2-6 | 2-5 | 2-6 | 2-5 | 2-6 | 1-4 |
| Substrate preheat temperature (° C.) | 150-600 | 150-600 | 100-400 | 100-400 | 100-500 | 100-400 | 100-400 | 100-400 | 100-400 |

Example 1

$ZrO_2$+7 wt % $Y_2O_3$ (7YSZ) Thermal Barrier Coating

The precursor solution was prepared as follows. Zirconium acetate was dissolved in a weak organic acid and then mixed with distilled water to form a solution having a pH of 3-5. The Zr solution was mixed with yttrium nitrate to form a precursor solution. Multiple coatings were formed by deposition of the precursor solution according to the parameters in Table 2.

Figure 3:
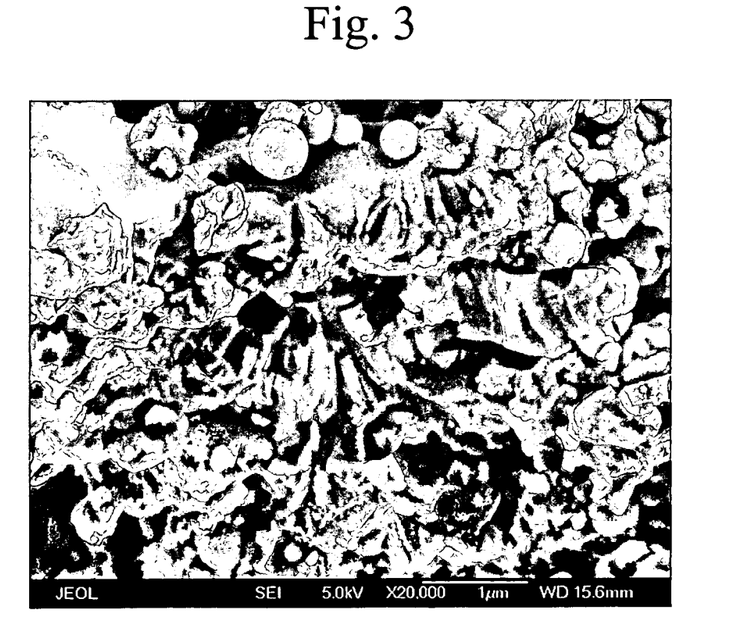
FIG. 3 shows scanning electron micrographs (SEM) of cross-section of a solution plasma spray-deposited coating of zirconia stabilized with 7 weight percent yttria based on the total weight of the material (7YSZ).

The solution plasma spray deposited 7YSZ had a porosity of about 15 volume % to about 30 volume % of the total volume of the coating and a thickness of about 300 micrometers to as much as 3,000 micrometers. The 7YSZ coating was well bonded to the substrate, contained fine splats, and contained some spaced vertical cracks as well as micrometer and nanometer-sized porosity. FIG. 3 shows the splats and vertical cracking. Moreover, the 7YSZ coating structure was verified to be stable in retaining nanometer grain size and reducing sintering during long-term exposure at an elevated temperature of 1121° C.

Using the above procedures, MCrAlY as well as Pt—Al bond coated Ni-based superalloy substrates were used for deposition of YSZ ceramic coatings. The deposited coatings were subjected to physical, microstructural and performance evaluation. The coating primary phase comprised t' tetragonal material.

Example 2

$ZrO_2$+20 wt % $Y_2O_3$ (20YSZ) Electrolyte Layer

The precursor solution was prepared by dissolving zirconium acetate in acetic acid and then mixing with distilled water with a pH of 3-5. Then yttrium nitrate was mixed with the solution to form the precursor solution. Multiple coatings were formed by deposition of the precursor solution according to the parameters in Table 2.

The solution plasma spray deposited 20YSZ had a porosity of less than about 2 volume % of the total volume of the coating (FIG. 6A). The coating was crack-free and adherent to the substrate when its thickness was below 100 micrometers. However, vertical cracks and coating exfoliation occurred in coatings having a thickness more than 200 micrometers. The coating comprised cubic-$ZrO_2$.

Figure 10:
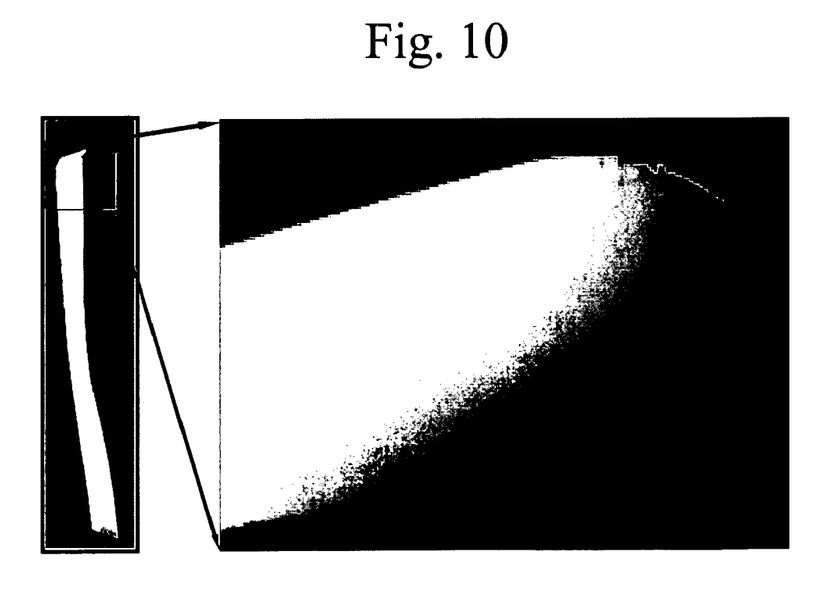
FIG. 10 shows the performance of a 20YSZ coating applied using the solution plasma spray method bent at angle of 90°.

A stainless steel strip was coated with a solution plasma spray-applied 20YSZ coating, then bent into 90° angles. As shown in FIG. 10, no spallation in the deformed area was found with the exception of minor cracks and slightly peeling of the coating at the edge area.

Example 3

$Al_2O_3$ Coating

The precursor solution was prepared by dissolving aluminum nitrate in distilled water to form a 1.0 mole precursor solution. Coatings were formed by deposition of the precursor solution according to the parameters in Table 2.

Example 4

NiO Anode Layer for an SOFC Unit

A sintered LaSrMn oxide tube (1.22 inches in outer diameter) was coated with NiO oxide using the solution plasma spray method. The precursor solution was prepared by dissolving a nickel salt ($Ni(NO_3)_3 \cdot 6H_2O$), in distilled water to form a solution. The coating was formed by deposition of the precursor solution according to the parameters in Table 2.

The solution plasma spray deposited NiO had a porosity of about 35 to about 45 volume % of the total volume of the coating (FIG. 6B) and a thickness of about 100 to about 200 micrometers. The coating microstructure was characterized by aggregated fine particles, weak cohesion and adherence to the substrate.

Example 5

$La_2O_3$-doped $CeO_2$ Solid Conductive Layer

A sintered strontium doped $LaMnO_3$ oxide tube (1.22 inches in outer diameter) was used as a substrate for the fabrication of a $La_2O_3$-doped $CeO_2$ ("LDC40") coating using the solution plasma spray method. The precursor solution was prepared by dissolving an organic cerium salt and an organic lanthanum salt in distilled water to form a 1.0 liter precursor solution. The coating was formed by deposition of the precursor solution according to the parameters in Table 2.

The LDC40 layer with a thickness of about 10 micrometers fully covered the tube surface.

Example 6

LDC40+NiO Anode Layer

A sintered strontium doped $LaMnO_3$ oxide tube (1.22 inches in outer diameter was used as a substrate for the formation of a mixed LDC40+NiO layer using the solution plasma spray method. The precursor solution was prepared by dissolving nickel nitrate, cerium acetate with lanthanum acetate in distilled water to form a precursor solution. Coatings were formed by deposition of the precursor solution according to the parameters in Table 2.

Figure 11:
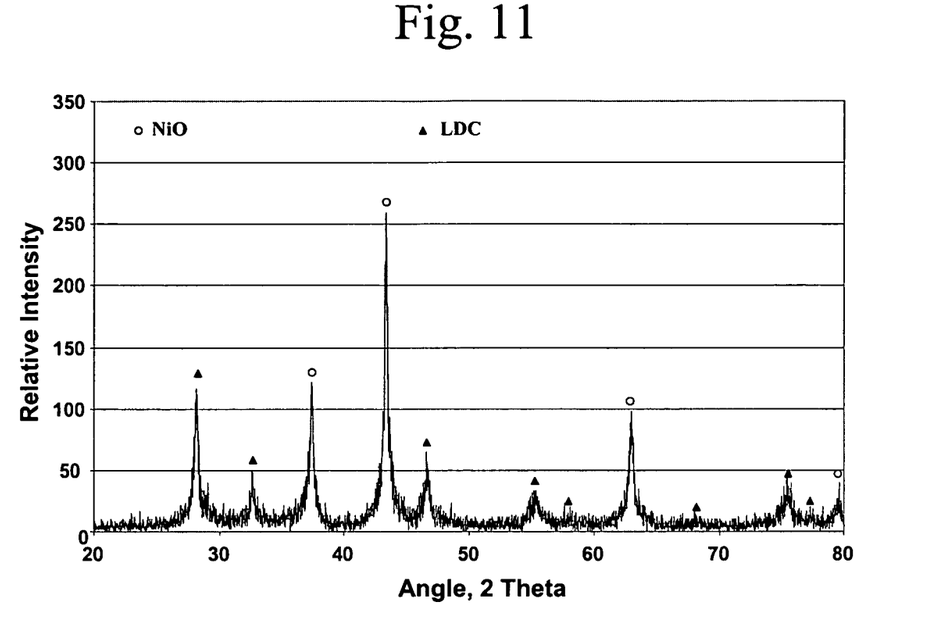
FIG. 11 shows the X-ray diffraction pattern for an LDC+NiO anode layer deposited by the solution plasma spray process.

The solution plasma spray deposited LDC+NiO had a porosity of about 35 to about 45 volume % of the total volume of the coating and a thickness of about 100 to about 200 micrometers. The coating microstructure was characterized by aggregated fine particles, weak cohesion, and adhesion to the substrate. The LDC+NiO phase composition was analyzed by X-ray diffraction analysis. The analysis indicated the presence of LDC and NiO phases with near complete crystallization in the as-deposited layer, shown in FIG. 11.

Example 7

LSM Tube/LSGM/LDC/LDC+NiO Solid Oxide Fuel Cell (SOFC) Unit

A single solid oxide fuel cell was fabricated by sequential thermal spraying a LaSrGaMn electrolyte, a LDC40 barrier and an LDC40+NiO anode on a sintered LaSrMn oxide tube substrate as cathode. First, a $La_{0.8}Sr_{0.2}Ga_{0.8}Mg_{0.2}$ oxide electrolyte layer was deposited onto the tube by conventional powdered feedstock plasma spray. Next, an LDC40 barrier was applied by the solution plasma spray process (coating FIG. 6a) as described in Example 5. Last, an LDC40+NiO anode layer was deposited using the solution plasma spray process (coating FIG. 6b) as described in Example 6.

Figure 12:
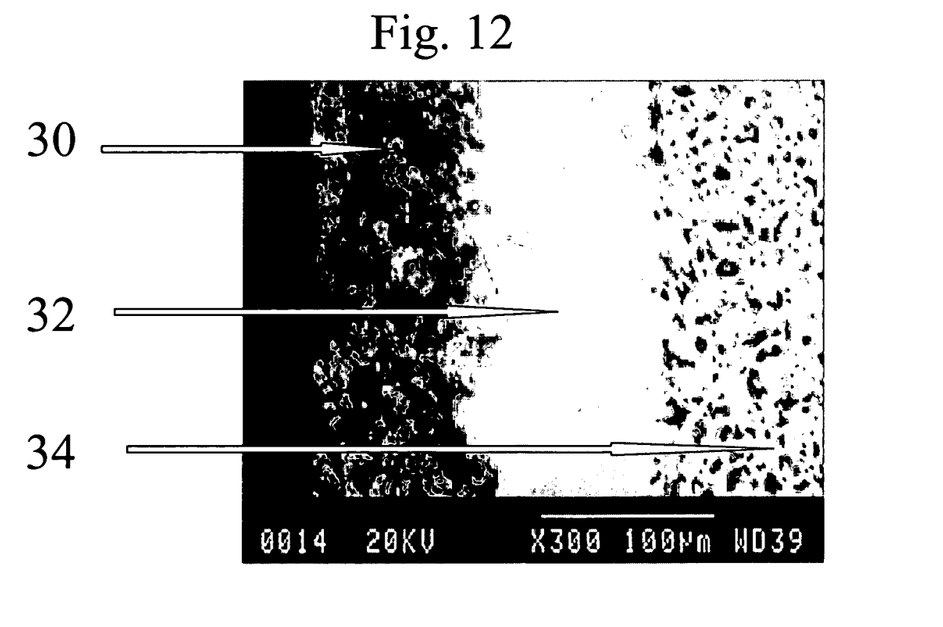
FIG. 12 shows the cross-sectional microstructure of solution plasma spray-formed LDC and LDC+NiO layers in a solid oxide fuel cell (SOFC).

A single SOFC fabricated by the solution plasma spray process was examined in cross-section by SEM observation. FIG. 12 shows a LaSrMn cathode 34 adjacent to a dense LaSrGaMn electrolyte 32. LDC40 barrier layer is located between LDC40+NiO layer 30 and LaSrGaMn electrolyte 32 but is too thin to be seen at this magnification. FIG. 12 illustrates that the solution plasma spray-LDC+NiO anode layer 30 and the solution plasma spray-LDC barrier layer satisfy the SOFC's requirements for a high porosity, thin coating.

Example 8

Varying the Morphology of a 20YSZ Coating

The 20YSZ coatings were produced using precursor solutions as in Example 2. Coatings were produced under three conditions: 1. low plasma heat input and substrate temperature, 2. high plasma heat input and substrate temperature, and 3. moderate plasma heat input and substrate temperature. Under condition 1, the coating produced had splats of about 5 to about 20 micrometers and nodules of less than 1 micrometer. Under condition 2, the coating produced had fine splats. Under condition 3, the coating produced had a combination of the morphologies produced by conditions 1 and 2.

Solution plasma spray has been employed to make coatings having a unique microstructure. The materials have fine splats, vertical cracks, and three-dimensional porosity. The microstructure of the materials makes them well suited for applications requiring exposure to temperatures of 1000° C. or higher, strong interface strength, low thermal conductivity and/or stress tolerance. The materials have many uses such as thermal barrier coating for hot-section components in gas turbine engines for jet aircraft and power generation and the like. Other applications include use as dielectric coatings, catalytic films, doped oxide films for use in fuel cells and gas separation and purification, electronic and ionic conductivity membranes and sensor devices. Because of the unique structure of the materials, they may even be used to form ceramic engine components for aircraft applications and diesel engines.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the described embodiments.

All cited patents, patent applications, and other references are incorporated herein by reference in their entirety.

The invention claimed is:

1. A material comprising: a metal oxide, metal carbide, metal nitride, metal silicide, semiconductor, stabilized or partially stabilized ceramic, or a combination of one or more of the foregoing,
    wherein splats having an average diameter of less than or equal to about 2 micrometers are present in the material, and
    wherein at least one inter pass boundary having a porosity of about 20 to about 95 volume percent, based on a total volume of the inter pass boundary, is present in the material.

2. The material of claim 1 wherein the splats have a thickness less than or equal to about 800 nanometers.

3. The material of claim 1, wherein all the splats are less than 5 micrometers in diameter.

4. The material of claim 1, wherein the material has a material porosity of about 1 to about 50 volume percent, based on the total volume of the material.

5. The material of claim 4 wherein the material porosity results from pores that are micrometer sized, submicron sized, nanometer sized, or a combination of two or more of the foregoing.

6. The material of claim 4 wherein the material porosity is greater than or equal to about 8 volume percent and the material porosity is three dimensional.

7. The material of claim 1 wherein the inter pass boundary has a thickness of about 0.1 to about 2 micrometers.

8. The material of claim 1 wherein the material coats a substrate and there are no inter pass boundaries within about 50 micrometers of an interface between the substrate and the material.

9. The material of claim 1 wherein one or more vertical cracks are present in the material.

10. The material of claim 9 wherein the vertical cracks have lengths of about 0.5 to about 1.0 times the thickness of the material.

11. The material of claim 9 wherein the vertical cracks are spaced at a distance up to two times the thickness of the material.

12. The material of claim 9, wherein the material has a porosity of about 1 to about 50 volume percent, based on the total volume of the material.

13. The material of claim 1, wherein the material has a thickness of about 1 micrometers to about 5 millimeters.

14. A wear resistant coating, corrosion resistance coating, thermal barrier coating, dielectric coating, catalytic film, electrolyte layer, electrode layer, thick metal oxide coating, solid conductive layer, soft magnetic film, semi-conductor film, sensor or activator comprising the material of claim 1.

15. The material of claim 1, wherein the metal comprises aluminum, boron, sodium, potassium, lithium, calcium, barium, and magnesium chromium, iron, nickel, zinc, niobium, titanium, zirconium, scandium, yttrium, lanthanum, cerium, gadolinium, praseodymium, neodymium, samarium, terbium, ytterbium or a combinations comprising one or more of the foregoing metals.

16. The material of claim 1, wherein the stabilized ceramic comprises zirconia stabilized with yttria, zirconia stabilized with ceria, zirconia stabilized with scandia, zirconia stabilized with calcia, zirconia stabilized with magnesia, zirconia stabilized with gadolinia, zirconia stabilized with lanthia, zirconia stabilized with samaria, zirconia stabilized with neodymium or zirconia stabilized with ytterbia.

17. A thermal barrier coating comprising: a metal oxide, metal carbide, metal nitride, metal silicide, stabilized or partially stabilized ceramic, or a combination of one or more of the foregoing,
    wherein splats having an average diameter of less than or equal to about 2 micrometers are present in the thermal barrier coating,
    wherein at least one inter pass boundary having a porosity of about 20 to about 95 volume percent, based on a total volume of the inter pass boundary, is present in the thermal barrier coating,
    wherein vertical cracks are present in the thermal barrier coating, and
    wherein the thermal barrier coating has a thickness of greater than about 125 micrometers and a coating porosity of about 15 to about 40 volume %, based on the total volume of the coating.

18. The thermal barrier coating of claim 17, wherein the stabilized ceramic comprises $ZrO_2$ and 7 percent by weight $Y_2O_3$ based on the total weight of the coating.

19. The thermal barrier coating of claim 17 wherein the inter pass boundary has a thickness of about 0.1 to about 2 micrometers.

20. The thermal barrier coating of claim 17, wherein the splats have a thickness less than or equal to about 800 nanometers.

21. The thermal barrier coating of claim 17, wherein all the splats are less than 5 micrometers in diameter.

22. The thermal barrier coating of claim 17 wherein the coating porosity results from pores that are micrometer sized, submicron sized, nanometer sized or a combination of two or more of the foregoing.

23. The thermal barrier coating of claim 17 wherein the coating porosity is three dimensional.

24. The thermal barrier coating of claim 17 wherein the vertical cracks have lengths of about 0.5 to about 1.0 times the thickness of the material.

25. The thermal barrier coating of claim 17 wherein the vertical cracks are spaced at a distance up to two times the thickness of the thermal barrier coating.

26. The thermal barrier coating of claim 17, wherein the metal comprises aluminum, boron, sodium, potassium, lithium, calcium, barium, and magnesium chromium, iron, nickel, zinc, niobium, titanium, zirconium, scandium, yttrium, lanthanum, cerium, gadolinium, praseodymium, neodymium, samarium, terbium, ytterbium or a combinations comprising one or more of the foregoing metals.

27. The thermal barrier coating of claim 17, wherein the stabilized ceramic comprises zirconia stabilized with yttria, zirconia stabilized with ceria, zirconia stabilized with scandia, zirconia stabilized with calcia, zirconia stabilized with magnesia, zirconia stabilized with gadolinia, zirconia stabilized with lanthia, zirconia stabilized with samaria, zirconia stabilized with neodymium or zirconia stabilized with ytterbia.

28. A coating or bulk structural material comprising at least two alternating layers wherein each layer comprises a metal oxide, metal carbide, metal nitride, metal silicide, stabilized or partially stabilized ceramic, or a combination of one or more of the foregoing, wherein splats having an average diameter of less than or equal to about 2 micrometers and no vertical cracks or inter pass boundaries are present in one layer, wherein about 80 to about 95% of the splats are splats having an average diameter of less than or equal to about 2 micrometers, and wherein inter pass boundaries and optionally vertical cracks are present in another layer.

* * * * *